United States Patent
Maekawa et al.

(10) Patent No.: US 11,079,873 B2
(45) Date of Patent: Aug. 3, 2021

(54) TOUCH PANEL DEVICE

(71) Applicant: MITSUBISHI ELECTRIC CORPORATION, Tokyo (JP)

(72) Inventors: Takuya Maekawa, Tokyo (JP); Yuichi Sasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/964,649

(22) PCT Filed: Jan. 31, 2018

(86) PCT No.: PCT/JP2018/003125
§ 371 (c)(1),
(2) Date: Jul. 24, 2020

(87) PCT Pub. No.: WO2019/150468
PCT Pub. Date: Aug. 8, 2019

(65) Prior Publication Data
US 2020/0371634 A1 Nov. 26, 2020

(51) Int. Cl.
G06F 3/041 (2006.01)
G06F 3/044 (2006.01)

(52) U.S. Cl.
CPC ............ *G06F 3/0414* (2013.01); *G06F 3/044* (2013.01); *G06F 3/0418* (2013.01)

(58) Field of Classification Search
CPC ......... G06F 3/0414–04146; G06F 3/044–0448
See application file for complete search history.

(56) References Cited

U.S. PATENT DOCUMENTS

| 2014/0071084 | A1 | 3/2014 | Sugiura |
| 2014/0368260 | A1 | 12/2014 | Tanada |
| 2015/0091859 | A1 * | 4/2015 | Rosenberg ............ G06F 3/0445 345/174 |
| 2015/0370385 | A1 | 12/2015 | Yamaguchi et al. |
| 2016/0253041 | A1 | 9/2016 | Park et al. |
| 2017/0336891 | A1 * | 11/2017 | Rosenberg .......... G06F 3/04166 |

FOREIGN PATENT DOCUMENTS

| JP | 2014-56421 A | 3/2014 |
| JP | 2016-6609 A | 1/2016 |
| WO | WO-2018039608 A1 * | 3/2018 ........... G06F 3/0446 |

* cited by examiner

Primary Examiner — Michael Pervan
(74) Attorney, Agent, or Firm — Birch, Stewart, Kolasch & Birch, LLP

(57) ABSTRACT

A touch panel device includes a touch panel on which capacitance in a conductor contact region of an operation surface changes, at least one pressure sensor to output a pressure detection signal according to pressing force applied to the operation surface and a pressing position, and a controller to calculate first coordinates on the operation surface based on the capacitance and calculates second coordinates on the operation surface based on a pressure value indicated by the pressure detection signal. The controller outputs an operation signal based on the first coordinates when a first region as a region where the capacitance is higher than predetermined threshold capacitance is detected, size of the first region is less than or equal to a predetermined certain value, and the pressing force is greater than predetermined threshold pressing force.

12 Claims, 13 Drawing Sheets

FIG. 6(a)

| DETECTION OF CONDUCTOR CONTACT REGION | DETECTION OF PRESSING FORCE | JUDGEMENT BY CONTROL UNIT 30 | OUTPUT SIGNAL |
|---|---|---|---|
| (OPERATION EX.1) NONE | NONE | • NO WATER DROPLET EXISTING REGION<br>• NO TOUCH OPERATION WITH CONDUCTOR/INSULATOR | NO OPERATION SIGNAL OUTPUT |
| (OPERATION EX. 2) NONE | DETECTED | • NO WATER DROPLET EXISTING REGION<br>• NO TOUCH OPERATION WITH CONDUCTOR. PRESENCE OF TOUCH OPERATION WITH INSULATOR | NO OPERATION SIGNAL OUTPUT (OR OUTPUT SIGNAL BASED ON PRESSURE COORDINATES) |
| (OPERATION EX. 3) DETECTED | NONE | • PRESENCE OF WATER DROPLET EXISTING REGION<br>• NO TOUCH OPERATION WITH CONDUCTOR/INSULATOR | NO OPERATION SIGNAL OUTPUT |
| DETECTED (SINGLE TOUCH) | DETECTED | (OPERATION EX. 4.1) SIZE OF CONDUCTOR CONTACT REGION IS LESS THAN OR EQUAL TO CERTAIN VALUE<br>• NO WATER DROPLET EXISTING REGION<br>• PRESENCE OF TOUCH OPERATION WITH CONDUCTOR, NO TOUCH OPERATION WITH INSULATOR | OUPUT SIGNAL BASED ON CAPACITANCE COORDINATES |
| | | (OPERATION EX. 4.2) SIZE OF CONDUCTOR CONTACT REGION IS GREATER THAN CERTAIN VALUE AND PRESSURE COORDINATES ARE IN CONDUCTOR CONTACT REGION<br>• PRESENCE OF WATER DROPLET EXISTING REGION<br>• PRESENCE OF TOUCH OPERATION WITH CONDUCTOR/INSULATOR IN WATER DROPLET EXSITING REGION | OUPUT SIGNAL BASED ON PRESSURE COORDINATES |

FIG. 6(b)

| DETECTION OF CONDUCTOR CONTACT REGION | DETECTION OF PRESSING FORCE | JUDGEMENT BY CONTROL UNIT 30 | OUTPUT SIGNAL |
|---|---|---|---|
| DETECTED (SINGLE TOUCH) | DETECTED | (OPERATION EX. 4.3) SIZE OF CONDUCTOR CONTACT REGION IS GREATER THAN CERTAIN VALUE AND PRESSURE COORDINATES ARE OUTSIDE CONDUCTOR CONTACT REGION AND IN VICINAL REGION<br>• PRESENCE OF WATER DROPLET EXISTING REGION<br>• PRESENCE OF TOUCH OPERATION WITH CONDUCTOR/INSULATOR IN WATER DROPLET EXISTING REGION | OUTPUT SIGNAL BASED ON COORDINATES OBTAINED BY CORRECTING PRESSURE COORDINATES |
| | | (OPERATION EX. 4.4) SIZE OF CONDUCTOR CONTACT REGION IS GREATER THAN CERTAIN VALUE AND PRESSURE COORDINATES ARE OUTSIDE CONDUCTOR CONTACT REGION IN VICINAL REGION<br>• PRESENCE OF WATER DROPLET EXISTING REGION<br>• PRESENCE OF TOUCH OPERATION WITH INSULATOR | NO OPERATION SIGNAL OUTPUT (OR OUTPUT SIGNAL BASED ON PRESSURE COORDINATES) |
| DETECTED (MULTI-TOUCH) | DETECTED | (OPERATION EX. 5.1) SIZE OF CONDUCTOR CONTACT REGION IS LESS THAN OR EQUAL TO CERTAIN VALUE<br>• NO WATER DROPLET EXISTING REGION<br>• PRESENCE OF MULTI-TOUCH OPERATION | OUTPUT SIGNAL BASED ON MULTIPLE SETS OF CAPACITANCE COORDINATES |
| | | (OPERATION EX. 5.2) A PLURALITY OF CONDUCTOR CONTACT REGIONS INCLUDE CONDUCTOR CONTACT REGION LARGER THAN CERTAIN VALUE AND PRESSURE COORDINATES ARE IN LARGE CONDUCTOR CONTACT REGION<br>• PRESENCE OF WATER DROPLET EXISTING REGION<br>• PART OF MULTI-TOUCH OPERATION HAS BEEN PERFORMED IN WATER DROPLET EXISTING REGION | OUTPUT SIGNAL BASED ON CAPACITANCE COORDINATES/ OUTPUT SIGNAL BASED ON PRESSURE COORDINATES FOR PRESSING POINT FOR WHICH CAPACITANCE COORDINATES CANNOT BE DETERMINED |

WHEN Fa << Fb, Fc, Fd

WHEN "NO" IN STEP S501

PROCESSING IN STEP S504

OPERATION IN STEP S505

TOUCH PANEL DEVICE

TECHNICAL FIELD

The present invention relates to a touch panel device including a touch panel of an electrostatic capacitance type.

BACKGROUND ART

In order to distinguish among various types of touch operations (referred to also as "touch gesture operations" or "touch input operations"), there has been proposed a touch panel device including a first touch panel of an electrostatic capacitance type and a second touch panel of a resistive film type arranged in superimposition with the first touch panel (Patent Reference 1, for example).

There has also been proposed a device that includes a touch panel of an electrostatic capacitance type, a transparent member arranged in superimposition with the touch panel, and a press detection unit for detecting distortion of the transparent member, and judges that two-dimensional coordinates detected by the touch panel are valid when the distortion is greater than a threshold value (Patent Reference 2, for example).

PRIOR ART REFERENCE

Patent Reference

Patent Reference 1: Japanese Patent Application Publication No. 2014-056421 (paragraphs 0011 and 0016 to 0019, for example)

Patent Reference 2: Japanese Patent Application Publication No. 2016-006609 (paragraphs 0012 to 0013, for example)

SUMMARY OF THE INVENTION

Problem to be Solved by the Invention

However, a touch panel of the resistive film type is incapable of correctly judging a multi-touch operation performed with a plurality of fingers contacting the touch panel. Accordingly, the device described in the Patent Reference 1 has a problem in that there are cases where the device is incapable of correctly judging the multi-touch operation and erroneous input is likely to occur when a water droplet exists on the first touch panel and the first touch panel has a water droplet existing region not functioning normally.

The device described in the Patent Reference 2 has a problem in that the touch operation in the water droplet existing region cannot be judged correctly and erroneous input is likely to occur when the touch panel has a region not functioning normally due to a water droplet adhering thereto.

The object of the present invention, which has been made to resolve the above-described problems, is to provide a touch panel device capable of correctly judging the touch operation even when a water droplet exists on the touch panel.

Means for Solving the Problem

A touch panel device according to an aspect of the present invention includes a touch panel having an operation surface on which a touch operation is performed and capacitance of a conductor contact region of the operation surface changes, a pressure sensor unit that outputs a pressure detection signal according to pressing force applied to the operation surface and a pressing position, and a control unit that calculates first coordinates on the operation surface based on the capacitance and calculates second coordinates on the operation surface based on pressure values indicated by the pressure detection signal. The control unit outputs an operation signal based on the first coordinates when a first region as a region where the capacitance is higher than predetermined threshold capacitance is detected, size of the first region is less than or equal to a predetermined certain value, and the pressing force is greater than predetermined threshold pressing force.

Effect of the Invention

According to the present invention, a touch operation can be judged correctly even when a water droplet exists on the touch panel.

BRIEF DESCRIPTION OF THE DRAWINGS

FIGS. 6($a$) and 6($b$) are diagrams showing operation examples of the touch panel device according to the first embodiment in a tabular format.

MODE FOR CARRYING OUT THE INVENTION

Touch panel devices according to embodiments of the present invention will be described below with reference to the accompanying drawings. The following embodiments are just examples and a variety of modifications are possible within the scope of the present invention.

(1) First Embodiment (1-1) Configuration

Figure 1:
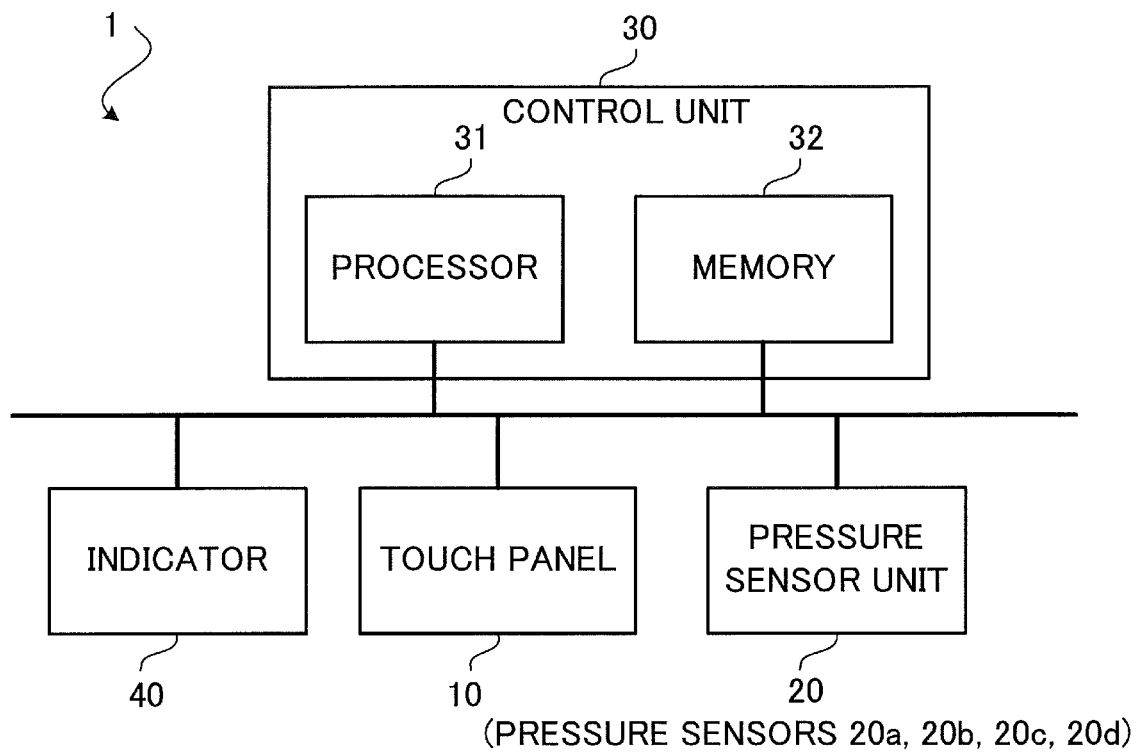
FIG. 1 is a diagram showing an example of a hardware configuration of a touch panel device according to a first embodiment of the present invention.

FIG. 1 is a diagram showing an example of a hardware configuration of a touch panel device 1 according to a first embodiment. As shown in FIG. 1, the touch panel device 1 includes a touch panel 10 of the electrostatic capacitance type, a pressure sensor unit 20 that detects pressing force applied to an operation surface of the touch panel 10 from above, and a control unit 30. The touch panel 10 is arranged in superimposition with the operation surface on which a touch operation is performed, and includes a display that displays a user interface (UI) image including an operation component (e.g., icon) or the like. The touch panel device 1 may include an indicator 40 that displays information based on the result of the touch operation.

The control unit 30 includes a processor 31 as an information processing unit and a memory 32 as a storage unit for storing information, for example. The processor 31 controls the operation of the whole of the touch panel device 1 by executing a program stored in the memory 32. The whole or part of the control unit 30 may be formed with a control circuit made of semiconductor integrated circuits. The memory 32 can include various types of storage devices such as a semiconductor storage device, a hard disk drive and a device that records information in a removable record medium. The memory 32 may store conductor contact information acquired from the touch panel 10 and pressure information acquired from the pressure sensor unit 20.

The control unit 30 executes a process corresponding to the touch operation performed on the operation surface of the touch panel 10. Specifically, the control unit 30 executes a process based on a change in the electrostatic capacitance corresponding to the touch operation performed on the operation surface of the touch panel 10 and a pressure detection signal outputted from the pressure sensor unit 20 corresponding to the pressing force applied to the operation surface. For example, the control unit 30 transmits an operation signal corresponding to the touch operation performed on the operation surface of the touch panel 10 to other equipment connected to the touch panel device 1 or other equipment capable of communicating with the touch panel device 1. The other equipment is external equipment such as a production facility, a vehicle or a household electric appliance, for example.

Figure 2:
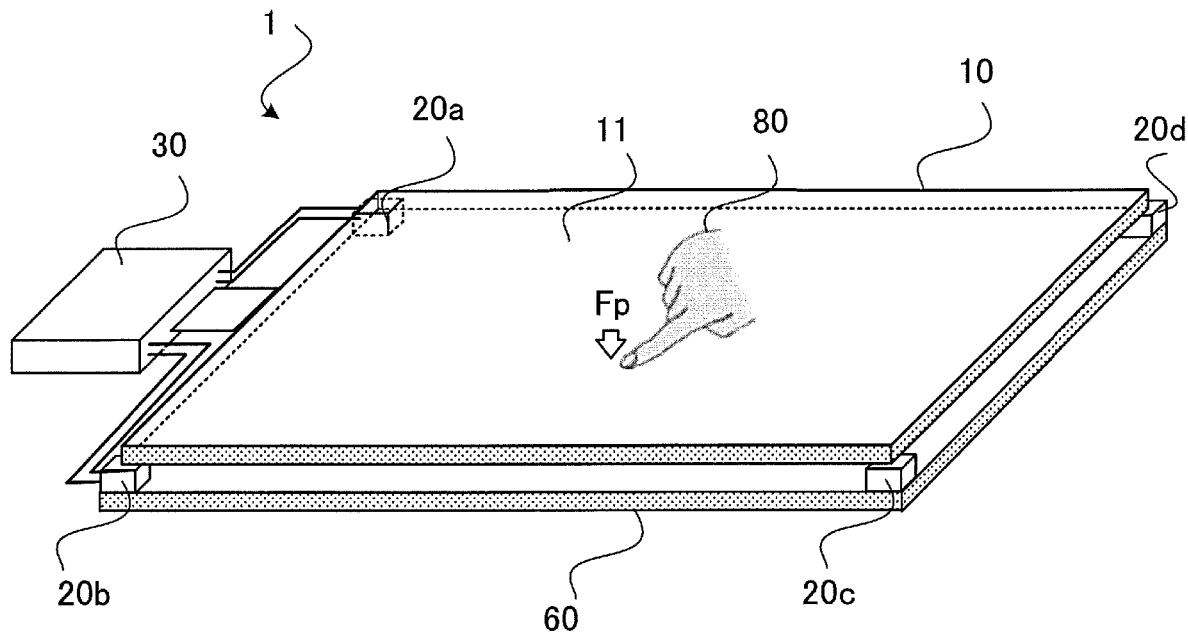
FIG. 2 is a perspective view schematically showing an example of a structure of the touch panel device according to the first embodiment.

FIG. 2 is a perspective view schematically showing an example of a structure of the touch panel device 1. As shown in FIG. 2, the touch panel device 1 includes a substrate 60 and four pressure sensors 20a, 20b, 20c and 20d that support the touch panel 10 on the substrate 60. The substrate 60 can be a part of a housing of the touch panel device 1. Further, while the control unit 30 in FIG. 2 is drawn outside the touch panel 10, the control unit 30 may be a part of the substrate 60 or a part of a circuit board mounted on the substrate 60. In FIG. 2, the pressure sensors 20a, 20b, 20c and 20d respectively support four corner parts of the touch panel 10 having a quadrangular plan-view shape. The pressure sensors 20a, 20b, 20c and 20d in FIG. 2 constitute the pressure sensor unit 20 in FIG. 1. Incidentally, the pressure sensors 20a, 20b, 20c and 20d may also be arranged to support the touch panel 10 at positions other than the corner parts. Further, the plan-view shape of the touch panel 10 can be a shape other than a quadrangle. Furthermore, the number of the pressure sensors supporting the touch panel 10 can also be three or less, or five or more. However, the number of the pressure sensors is desired to be four or more since accuracy of the result of calculation of pressure coordinates indicating a pressing position decreases with the decrease in the number of the pressure sensors.

As shown in FIG. 2, the touch panel 10 has an operation surface 11 on which the touch operation is performed with a finger 80 of an operator. When a conductor (i.e., electrically conductive object) is in contact with the operation surface 11, the capacitance of the conductor contact region changes. The conductor is, for example, the finger 80 of the operator or an operation assistance tool such as a stylus pen made with electrically conductive material. A water droplet that can be in contact with the operation surface 11 is also a conductor. The control unit 30 detects the capacitance at each position on the operation surface 11 and thereby acquires the position (i.e., two-dimensional coordinates on the operation surface 11) of the conductor contact region. Namely, the control unit 30 calculates first coordinates indicating the position of the conductor contact region on the operation surface 11 based on the capacitance at each position on the operation surface 11 of the touch panel 10. The conductor contact region is, for example, a region in which the capacitance is higher than predetermined threshold capacitance (ThC). The conductor contact region is a "capacitance change region". The first coordinates will be referred to also as "capacitance coordinates".

Pressure corresponding to the pressing force Fp applied to the operation surface 11 of the touch panel 10 is detected by the pressure sensors 20a, 20b, 20c and 20d. The pressure sensors 20a, 20b, 20c and 20d output pressure detection signals indicating pressure values Fa, Fb, Fc and Fd corresponding to magnitude (i.e., strength) of the pressing force Fp applied to the operation surface 11 and the pressing position. The control unit 30 is capable of calculating the pressing force Fp and second coordinates as coordinates indicating the pressing position on the operation surface 11 based on the pressure values Fa, Fb, Fc and Fd indicated by the pressure detection signals outputted from the pressure sensors 20a, 20b, 20c and 20d. The second coordinates will be referred to also as "pressure coordinates".

Figure 3:
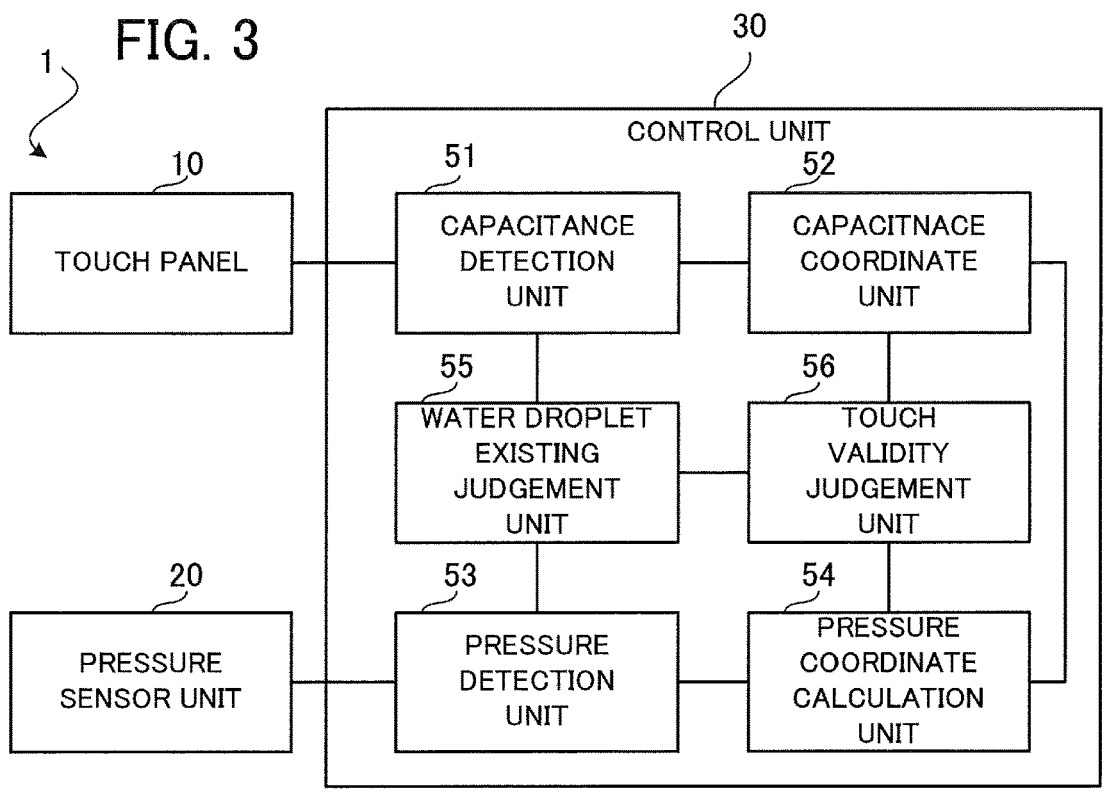
FIG. 3 is a functional block diagram schematically showing the touch panel device according to the first embodiment.

FIG. 3 is a functional block diagram schematically showing the touch panel device 1 according to the first embodiment. In FIG. 3, each component identical or corresponding to a component shown in FIG. 1 is assigned the same reference character as in FIG. 1. As shown in FIG. 3, the control unit 30 includes a capacitance detection unit 51, a capacitance coordinate calculation unit 52, a pressure detection unit 53, a pressure coordinate calculation unit 54, a water droplet existing judgment unit 55 and a touch validity judgment unit 56.

The capacitance detection unit 51 detects contact status of a conductor on the operation surface 11 of the touch panel 10 by detecting the capacitance at each position on the operation surface 11. The capacitance detection unit 51 supplies a detection value of the capacitance to the capacitance coordinate calculation unit 52.

The capacitance coordinate calculation unit 52 calculates the first coordinates, as the coordinates of the conductor contact region as the region in which the detection value of the capacitance is higher than the predetermined threshold capacitance ThC, based on the detection values of the capacitance supplied from the capacitance detection unit 51.

The pressure detection unit 53 receives the pressure detection signals outputted from the pressure sensors 20a, 20b, 20c and 20d constituting the pressure sensor unit 20 and supplies the pressure values Fa, Fb, Fc and Fd indicated by the pressure detection signals to the pressure coordinate calculation unit 54 and the water droplet existing judgment unit 55.

The pressure coordinate calculation unit 54 calculates the second coordinates indicating the pressing position on the operation surface 11 based on coordinates of installation positions of the pressure sensors 20a, 20b, 20c and 20d and the pressure values Fa, Fb, Fc and Fd acquired from the pressure detection unit 53. The pressure coordinate calculation unit 54 may refer to the first coordinates, as the capacitance coordinates calculated by the capacitance coordinate calculation unit 52, in order to calculate multiple sets of second coordinates based on the pressure values Fa, Fb, Fc and Fd.

The water droplet existing judgment unit 55 judges whether the conductor contact region is a water droplet existing region or not based on the detection value of the capacitance supplied from the capacitance detection unit 51 and the pressure values Fa, Fb, Fc and Fd supplied from the pressure detection unit 53. For example, when the pressing force Fp on the operation surface 11 is less than or equal to predetermined threshold pressing force ThF even though a conductor contact region exists, the water droplet existing judgment unit 55 judges that the conductor contact region is a water droplet existing region where a water droplet exists on the operation surface 11. Incidentally, there are cases where a water droplet existing region is grounded to GND (i.e., reference electrical potential point such as a human or a housing of a device).

The touch validity judgment unit 56 judges whether a touch operation is valid or invalid based on information indicating the water droplet existing region acquired from the water droplet existing judgment unit 55, the first coordinates as the coordinates of the conductor contact region acquired from the capacitance coordinate calculation unit 52, and the second coordinates acquired from the pressure coordinate calculation unit 54. Further, in consideration of a calculation error of the pressure coordinate calculation unit 54, the touch validity judgment unit 56 may execute a process of correcting the second coordinates based on the coordinates of the conductor contact region acquired from the capacitance coordinate calculation unit 52 and the information indicating the water droplet existing region acquired from the water droplet existing judgment unit 55. This correction process will be described later with reference to FIG. 9.

(1-2) Operation

The control unit 30 operates as follows based on the capacitance at each position on the operation surface 11 supplied from the touch panel 10 and the pressure values Fa, Fb, Fc and Fd indicated by the pressure detection signals supplied from the pressure sensors 20a, 20b, 20c and 20d:

FIGS. 4(a) to 4(d) are diagrams showing an example of conductor contact regions 101 to 104 and pressing force detection positions 201 to 204 when a single touch operation is performed on the operation surface 11 of the touch panel 10. FIGS. 5(a) and 5(b) are diagrams showing an example of conductor contact regions 111 to 114 when a double touch operation as a multi-touch operation is performed on the operation surface 11 of the touch panel 10.

Operation Example 1

An operation example 1 is a case where
(Condition 1A) no conductor contact region is detected on the operation surface 11 and
(Condition 1B) no pressing force pressing the operation surface 11 is detected.

"No pressing force is detected" means that the pressing force Fp as a value (e.g., a total value) based on the pressure values Fa, Fb, Fc and Fd is less than or equal to the predetermined threshold pressing force ThF. "Pressing force is detected" means that the pressing force Fp is greater than the threshold pressing force ThF. However, the judgment on whether pressing force is detected or not may be made by a different method.

In this case, the control unit 30 judges that neither a touch operation with a conductor nor a touch operation with an insulator has been performed on the operation surface 11 and there is no water droplet existing region either.

In this case, the control unit 30 outputs no operation signal to the external equipment.

Operation Example 2

An operation example 2 is a case where
(Condition 2A) no conductor contact region is detected on the operation surface 11 and
(Condition 2B) pressing force pressing the operation surface 11 is detected.

In this case, the control unit 30 judges that a touch operation with an insulator has been performed on the operation surface 11 while no touch operation with a conductor has been performed on the operation surface 11.

In this case, the control unit 30 outputs no operation signal to the external equipment. However, in this case, the control unit 30 may output an operation signal based on the second coordinates as the pressure coordinates calculated from the pressure values Fa, Fb, Fc and Fd to the external equipment.

Operation Example 3

An operation example 3 is a case where
(Condition 3A) a conductor contact region is detected on the operation surface 11 and
(Condition 3B) no pressing force pressing the operation surface 11 is detected.

In this case, the control unit 30 judges that there is a water droplet existing region on the operation surface 11 and no touch operation with a conductor has been performed on the operation surface 11.

In this case, the control unit 30 outputs no operation signal to the external equipment.

Operation Example 4.1

Figure 4A:
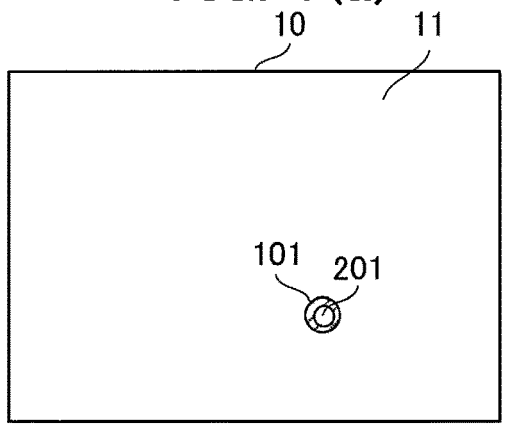
FIGS. 4($a$) to 4($d$) are diagrams showing an example of conductor contact regions (hatching regions) and an example of pressing force detection positions (open circle positions) when a single touch operation is performed on an operation surface of a touch panel.
Figure 5A:
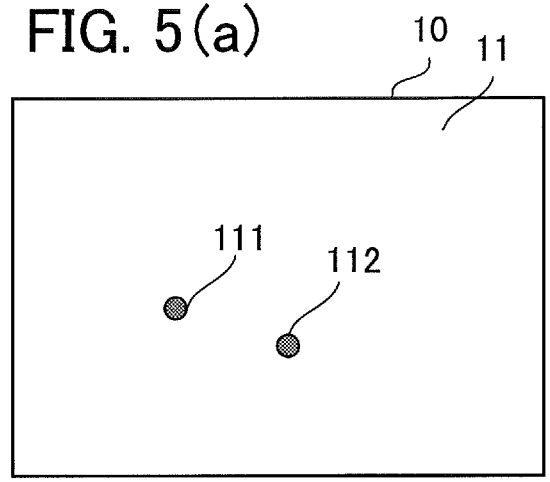
FIGS. 5($a$) and 5($b$) are diagrams showing an example of conductor contact regions (hatching regions) when a multi-touch operation is performed on the operation surface of the touch panel.
Figure 5B:
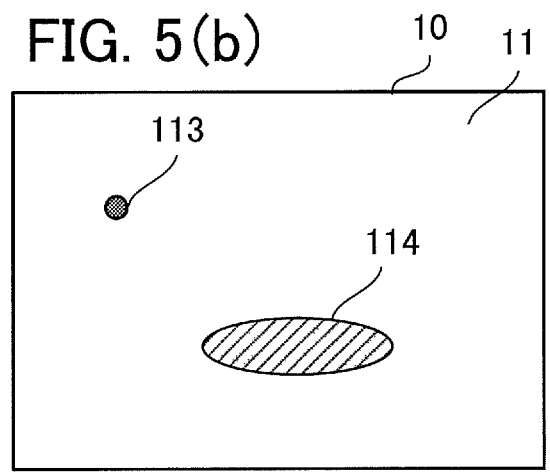

As shown in FIG. 4(a), an operation example 4.1 is a case where
(Condition 4.1A) one conductor contact region (first region) 101 is detected on the operation surface 11,
(Condition 4.1B) pressing force pressing the operation surface 11 at a pressing position 201 is detected, and
(Condition 4.1C) size (e.g., area, length or the like) of the detected conductor contact region 101 is less than or equal to a certain value ThA as a predetermined threshold value.

In this case, the control unit 30 judges that there is no water droplet existing region on the operation surface 11 and a normal single touch operation with a conductor has been performed on the operation surface 11.

In this case, the control unit 30 outputs an operation signal based on the first coordinates as the capacitance coordinates calculated from position coordinates of the conductor contact region 101 to the external equipment. However, in this case, the control unit 30 may output an operation signal based on the second coordinates as the pressure coordinates calculated from the pressure values Fa, Fb, Fc and Fd to the external equipment.

Operation Example 4.2

Figure 4B:
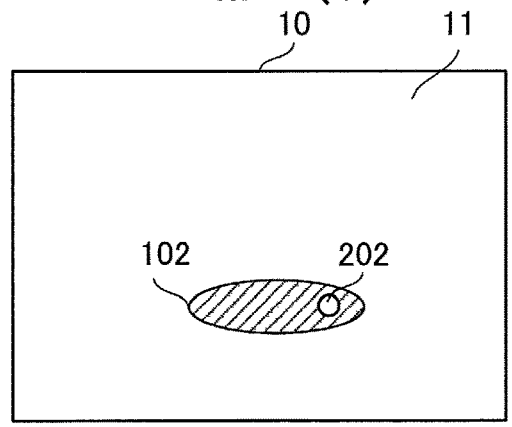

As shown in FIG. 4(b), an operation example 4.2 is a case where
(Condition 4.2A) one conductor contact region 102 is detected on the operation surface 11,
(Condition 4.2B) pressing force pressing the operation surface 11 at a pressing position 202 is detected,
(Condition 4.2C) size (e.g., area, length or the like) of the conductor contact region 102 is greater than the certain value ThA, and
(Condition 4.2D) the second coordinates as the pressure coordinates of the pressing position 202 calculated from the pressure values Fa, Fb, Fc and Fd exist in the conductor contact region (second region) 102.

In this case, the control unit 30 judges that a water droplet existing region corresponding to the conductor contact region 102 exists on the operation surface 11 and a single touch operation has been performed in the water droplet existing region.

In this case, the control unit 30 outputs an operation signal based on the second coordinates as the pressure coordinates to the external equipment.

Operation Example 4.3

Figure 4C:
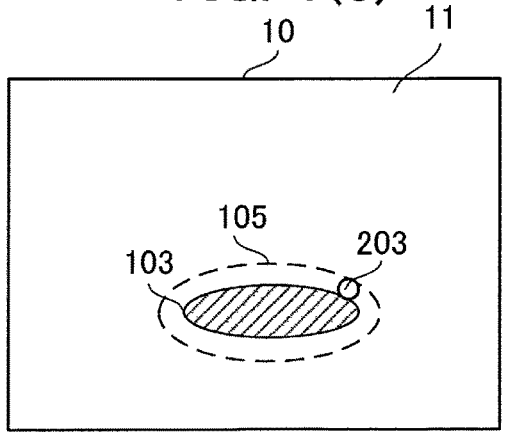

As shown in FIG. 4(c), an operation example 4.3 is a case where
(Condition 4.3A) one conductor contact region 103 is detected on the operation surface 11,
(Condition 4.3B) pressing force pressing the operation surface 11 at a pressing position 203 is detected,
(Condition 4.3C) size (e.g., area, length or the like) of the conductor contact region 103 is greater than the certain value ThA, and
(Condition 4.3D) the second coordinates as the pressure coordinates of the pressing position 203 calculated from the pressure values Fa, Fb, Fc and Fd exist in a vicinal region 105 outside the conductor contact region (third region) 103 and surrounding the conductor contact region 103 within a certain distance from the conductor contact region 103.

This case is a case where the control unit 30 judges that a water droplet existing region corresponding to the conductor contact region 103 exists on the operation surface 11 and the pressure coordinates are situated slightly outside the water droplet existing region due to an error in calculating the pressure coordinates even though a single touch operation with a conductor was performed actually in the water droplet existing region.

In this case, the control unit 30 makes a correction of moving the second coordinates as the pressure coordinates towards the conductor contact region 103 and outputs an operation signal based on the corrected coordinates to the external equipment.

An example of the correction method in this case will be described here. Although there is a calculation method based on equilibrium of the moments of force as a calculation method of the pressure coordinates, a problem with the pressure coordinates can be pointed out in that accuracy (detection accuracy) of the pressure coordinates is low in comparison with the capacitance coordinates. Thus, when the pressing position is in an edge part of the conductor contact region 103, the calculated pressure coordinates can be beyond the conductor contact region 103. Also in this case, the actual touch operation coordinates are considered to exist in the conductor contact region 103 determined by the electrostatic capacitance method. Therefore, the pressure coordinates can be corrected by moving the calculated pressure coordinates to the inside of the conductor contact region 103 (e.g., onto a boundary line of the conductor contact region 103). A concrete example of the correction method will be described later with reference to FIG. 9.

Operation Example 4.4

Figure 4D:
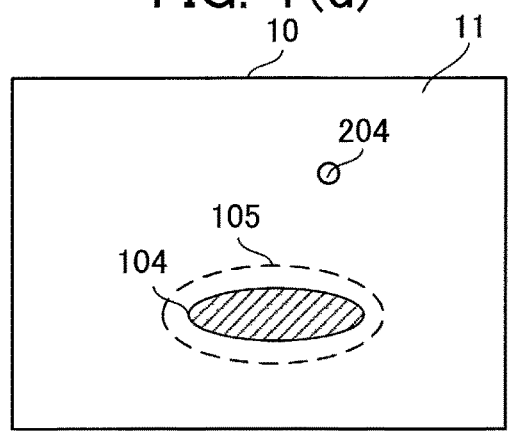

As shown in FIG. 4(d), an operation example 4.4 is a case where
(Condition 4.4A) one conductor contact region (fourth region) 104 is detected on the operation surface 11,
(Condition 4.4B) pressing force pressing the operation surface 11 at a pressing position 204 is detected,
(Condition 4.4C) size (e.g., area, length or the like) of the conductor contact region 104 is greater than the certain value ThA, and
(Condition 4.4D) the second coordinates as the pressure coordinates calculated from the pressure values Fa, Fb, Fc and Fd exist outside the conductor contact region 104 and exist outside the vicinal region 105.

In this case, the control unit 30 judges that a water droplet existing region corresponding to the conductor contact region 104 exists on the operation surface 11 and a touch operation with an insulator has been performed on the operation surface 11 while no touch operation with a conductor has been performed on the operation surface 11.

In this case, the control unit 30 outputs no operation signal to the external equipment. Incidentally, in this case, the control unit 30 may output an operation signal based on the second coordinates as the pressure coordinates calculated from the pressure values Fa, Fb, Fc and Fd to the external equipment.

Operation Example 5.1

As shown in FIG. 5(a), an operation example 5.1 is a case where
(Condition 5.1A) a plurality of conductor contact regions (fifth and sixth regions) 111, 112 are detected on the operation surface 11,
(Condition 5.1B) pressing force pressing the operation surface 11 at each pressing position is detected, and (Condition 5.1C) size of each of the conductor contact regions 111, 112 is less than or equal to the certain value ThA.

In this case, the control unit 30 judges that there is no water droplet existing region on the operation surface 11 and a multi-touch operation as a normal touch operation at a plurality of positions with conductors has been performed.

In this case, the control unit 30 outputs an operation signal based on multiple sets of first coordinates as multiple sets of capacitance coordinates calculated from the plurality of conductor contact regions 111, 112 to the external equipment.

Operation Example 5.2

As shown in FIG. 5(*b*), an operation example 5.2 is a case where
(Condition 5.2A) a plurality of conductor contact regions (seventh and eighth regions) 113, 114 are detected on the operation surface 11,
(Condition 5.2B) pressing force pressing the operation surface 11 at each pressing position is detected,
(Condition 5.2C) size of the conductor contact region 114 as one of the conductor contact regions 113, 114 is greater than the certain value ThA, and
(Condition 5.2D) the second coordinates as the pressure coordinates calculated from the pressure values Fa, Fb, Fc and Fd exist in the conductor contact region 114.

In this case, the control unit 30 judges that a water droplet existing region corresponding to the conductor contact region 114 exists on the operation surface 11 and one touch operation included in a multi-touch operation has been performed in the conductor contact region 114.

In this case, the control unit 30 outputs an operation signal based on the first coordinates as the capacitance coordinates in regard to coordinates of a touch operation that can be determined in the conductor contact region 113, and outputs an operation signal based on the second coordinates as the pressure coordinates in regard to an operation position for which the capacitance coordinates cannot be determined based on the conductor contact region 114.

The contents of the "operation example 1" to the "operation example 5.2" described above are simply shown in a tabular format in FIGS. 6(*a*) and 6(*b*).

Figure 7:
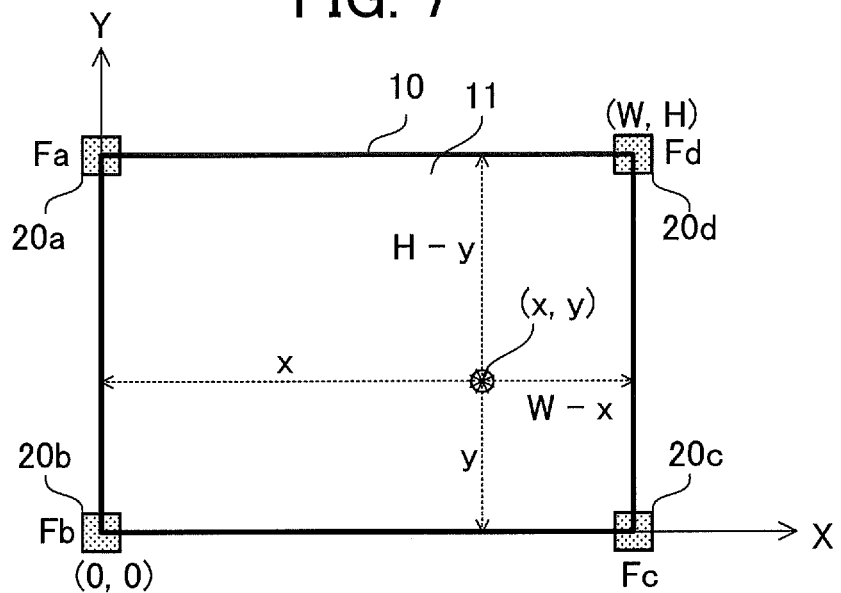
FIG. 7 is a diagram showing an example of a method of calculating pressure coordinates (x, y) indicating a detection position of pressing force when a single touch operation is performed on the operation surface of the touch panel.
Figure 8:
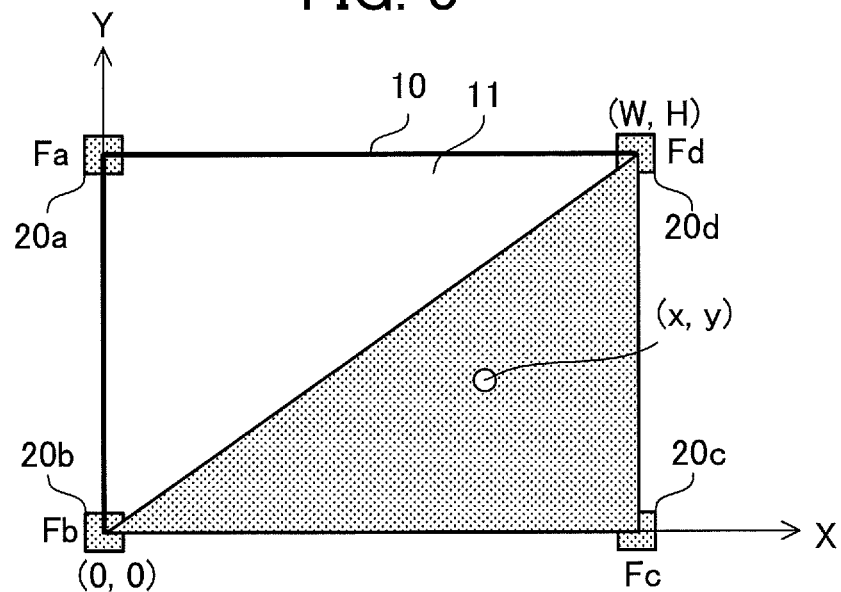
FIG. 8 is a diagram showing another example of the method of calculating the pressure coordinates (x, y) indicating the detection position of the pressing force when a single touch operation is performed on the operation surface of the touch panel.

FIG. 7 and FIG. 8 are diagrams showing examples of the method of calculating the pressure coordinates (x, y) indicating the pressing position when a single touch operation is performed on the operation surface 11 of the touch panel 10.

FIG. 7 shows an example of calculation by using relationship between the moments of force. In this example, four corner parts of the touch panel 10 having a horizontal direction size W and a vertical direction size H are supported by the pressure sensors 20a, 20b, 20c and 20d. The coordinates of the four corner parts are (H, 0), (0, 0), (0, H) and (W, H). The pressure coordinates (x, y) are calculated based on equilibrium equations of the moments of force in the x-axis direction and the y-axis direction. Specifically, when the pressure values detected by the pressure sensors 20a, 20b, 20c and 20d are Fa, Fb, Fc and Fd as shown in FIG. 7, the equilibrium equations of the moments of force in the x-axis direction and the y-axis direction are the following equations (1) and (2): The pressure coordinates (x, y) can be calculated from the equations (1) and (2).

$$(Fa+Fb)x = (Fc+Fd)(W-x) \quad (1)$$

$$(Fb+Fc)y = (Fa+Fd)(H-y) \quad (2)$$

When a pressure sensor (e.g., 20a) whose pressure value is the lowest among the pressure sensors 20a, 20b, 20c and 20d is at a position farthest from input coordinates and the pressure value (e.g., Fa) is extremely lower than the pressure values (e.g., Fb, Fc and Fd) of the other pressure sensors (e.g., 20b, 20c and 20d) as shown in FIG. 8, it is possible to neglect the influence of the pressure sensor 20a and perform the calculation as equilibrium of the moments of force in a triangle formed by connecting the pressure sensors 20b, 20c and 20d.

The examples of FIG. 7 and FIG. 8 are calculation examples of the pressure coordinates when the four corner parts of the touch panel 10 are supported by the pressure sensors 20a, 20b, 20c and 20d. When the number of pressure sensors 20a, 20b, 20c, 20d is increased or the arrangement of the pressure sensors 20a, 20b, 20c, 20d is changed, the calculation equations may be changed depending on the number and positions of pressure sensors 20a, 20b, 20c, 20d.

Instead of the above-described calculation methods of the pressure coordinates, it is also possible to employ a method of calculating the pressure coordinates as a regression problem, or a method that uses an evaluation function to which arbitrary coordinate values on the operation surface 11 of the touch panel 10 are inputted and outputs coordinates that minimize a numerical value obtained as the evaluation result with the evaluation function as the pressure coordinates.

Figure 9:
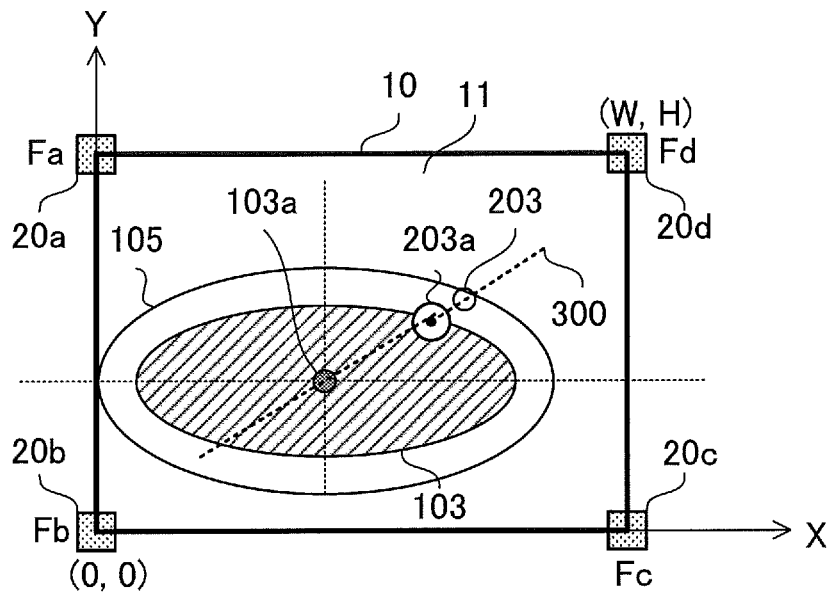
FIG. 9 is a diagram showing an example of a method of correcting the pressure coordinates indicating the detection position of the pressing force when a single touch operation is performed on the operation surface of the touch panel.

FIG. 9 is a diagram showing a method of correcting the pressure coordinates in the aforementioned "operation example 4.3". In FIG. 9, the pressure coordinates of the pressing position 203 obtained by the calculation exist outside the conductor contact region 103 that is a water droplet existing region and inside the vicinal region 105. However, the input coordinates on the operation surface 11 of the touch panel 10 are considered to exist actually within the range of the conductor contact region 103 since the accuracy of the first coordinates obtained from the capacitance is higher than the accuracy of the second coordinates as the pressure coordinates. Therefore, it is desirable to correct the pressure coordinates of the pressing position 203 by using the conductor contact region 103. Specifically, a point at the pressure coordinates of the pressing position 203 and a central point 103a as a representative point of the conductor contact region 103 are connected to each other by a straight line 300 and the coordinates of an intersection point of the boundary line of the conductor contact region 103 and the straight line 300 are determined as the corrected pressure coordinates 203a. Here, the central point 103a is an example of the representative point of the conductor contact region 103. The central point 103a is, for example, a gravity central position, the midpoint of the longest axis of the conductor contact region 103, or the like. However, it is also possible to determine the straight line 300 by using a representative point other than the central point 103a. Incidentally, FIG. 9 just shows an example of the correction method; the pressure coordinates may be corrected by using a different method.

Figure 10:
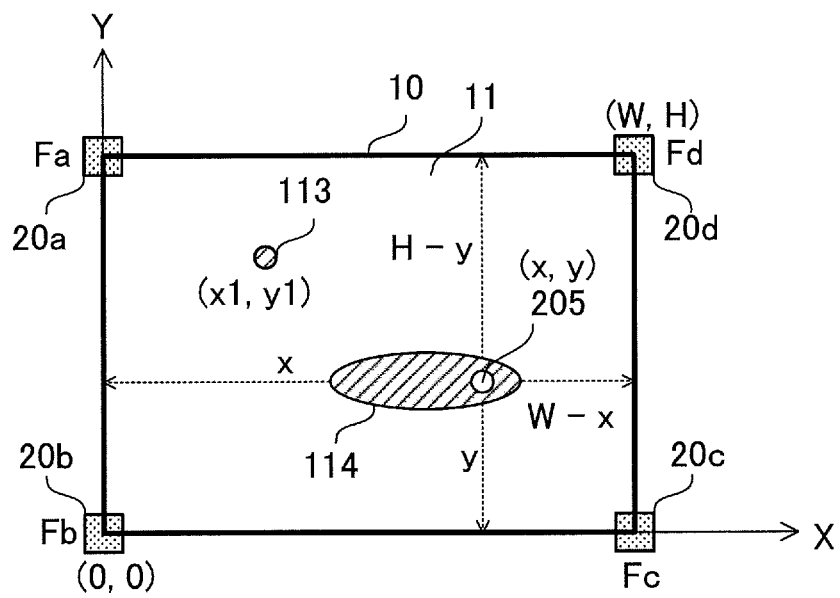
FIG. 10 is a diagram showing an example of a method of calculating the pressure coordinates indicating the detection position of the pressing force when multi-touch operation is performed on the operation surface of the touch panel.

FIG. 10 is a diagram showing a calculation example of the pressure coordinates when a multi-touch operation is performed. In this example, touch operation is performed at two points, one point exists inside the conductor contact region 113, and the other point exists inside the conductor contact region 114. Similarly to the case of FIG. 7, the four corner parts of the touch panel 10 are supported by the pressure sensors 20a, 20b, 20c and 20d, and the pressure coordinates of a pressing position 205 can be calculated by using the equilibrium equations of the moments of force.

In this use case, it is assumed as a precondition that the coordinates of the conductor contact region 113 have been successfully determined by the electrostatic capacitance method. Further, since it is difficult to determine the pressing force at each pressing position among a plurality of points by use of the four pressure sensors 20a, 20b, 20c and 20d, the two touch operations are assumed to have been performed with pressing force of the same strength. Incidentally, it is also possible to increase the number of pressure sensors and perform calculation on the assumption that the pressing force of each of a plurality of touch operations differ from each other.

Let Fa, Fb, Fc and Fd represent the pressure values detected by the pressure sensors 20a, 20b, 20c and 20d, Fn represent the pressing force at the touch operation position (205 in FIG. 10), and (x1, y1) represent the coordinates of the touch point determined by the electrostatic capacitance method (113 in FIG. 10), the equilibrium equations of the moments of force in the x-axis direction are the following equations (3) and (4) and the equilibrium equations of the moments of force in the y-axis direction are the following equations (5) and (6):

$$(Fa+Fb)x+Fn(x1-x)=(Fc+Fd)(W-x) \quad (3)$$

$$(Fa+Fb)x1+Fn(x-x1)=(Fc+Fd)(W-x1) \quad (4)$$

$$(Fb+Fc)y+Fn(y1-y)=(Fa+Fd)(H-y) \quad (5)$$

$$(Fb+Fc)y1+Fn(y-y1)=(Fa+Fd)(H-y1) \quad (6)$$

The x coordinate of the coordinates (x, y) is obtained from the simultaneous equations (3) and (4), and the y coordinate of the coordinates (x, y) is obtained from the simultaneous equations (5) and (6).

Figure 11:
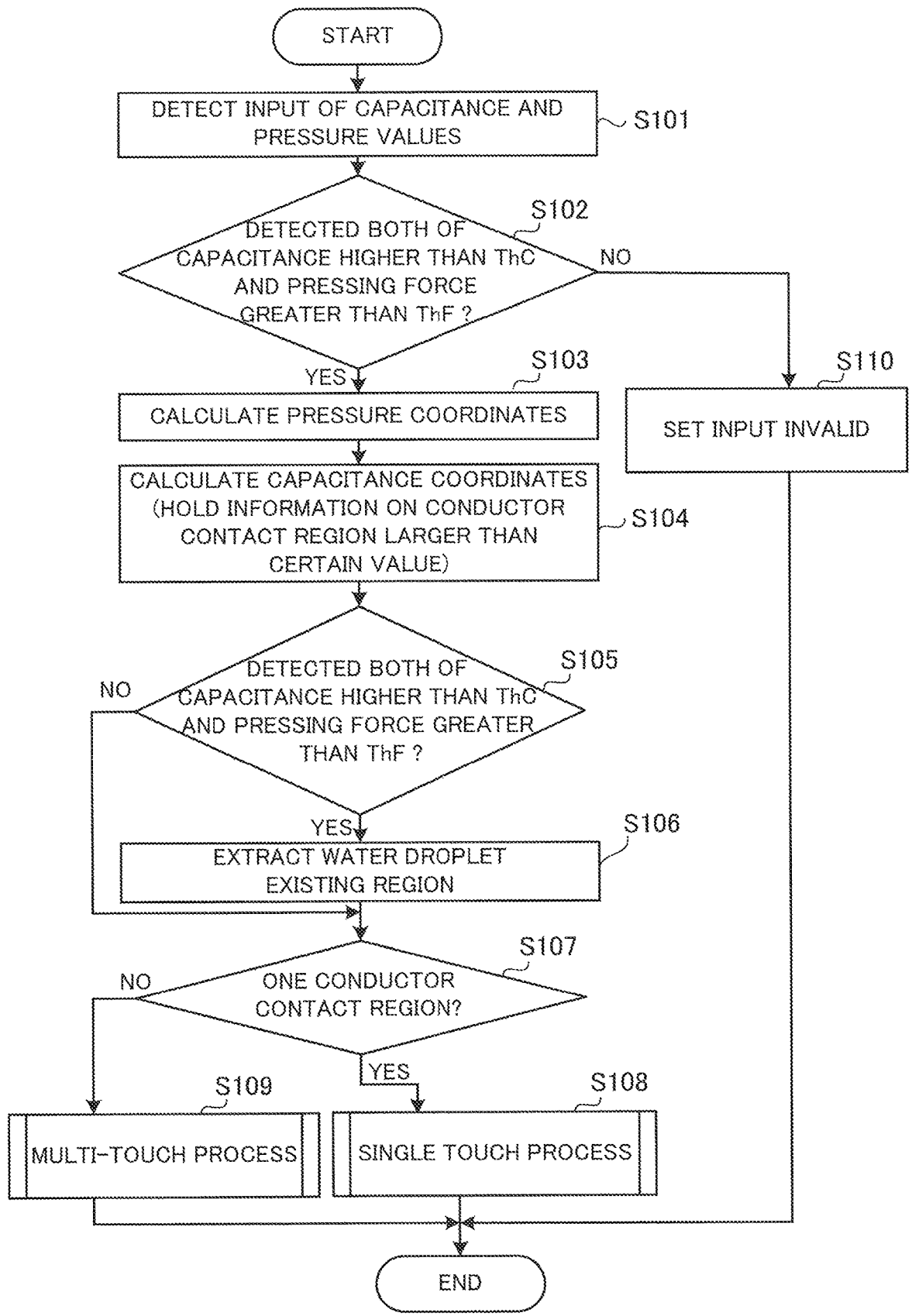
FIG. 11 is a flowchart showing an operation example of the touch panel device according to the first embodiment.

FIG. 11 is a flowchart showing the operation of the touch panel device 1 according to the first embodiment. In step S101, the control unit 30 detects input of the capacitance and the pressure values on the touch panel 10.

In step S102, the control unit 30 checks whether both of the capacitance and the pressure values are detected. The control unit 30 recognizes the current state as a state in which an insulator touches the operation surface 11 when only the pressing force is detected (the case of the "operation example 2"), recognizes the current state as a state in which a conductor such as a water droplet is in contact with the touch panel when only the capacitance is detected (the case of the "operation example 3"). In the both states, the control unit 30 set the input invalid in step S110.

In step S103, the control unit 30 calculates the pressure coordinates from the information on the pressure values by using the equations (1) and (2).

In step S104, the control unit 30 calculates the capacitance coordinates from the result of the detection of the capacitance. In a state in which a liquid such as a water droplet is in contact with the touch panel and the water droplet is grounded to GND like a case where a finger is in contact with the region, a conductor contact region larger than a certain value ThA is detected, not punctual coordinates. In this case, information on the conductor contact region is stored in the storage unit since it is difficult to determine the input coordinates.

In step S105, the control unit 30 judges whether or not a conductor contact region larger than the certain value ThA is detected. When the conductor contact region larger than the certain value ThA is detected, the control unit 30 judges whether or not the conductor contact region is a water droplet existing region in step S106. In a case where a water droplet is in contact with an edge part of the touch panel 10 and a touch operation is performed at a position totally separate from the conductor contact region, the pressure coordinates and the position of the water droplet existing region do not overlap at all. In a case where it can be asserted that there is no input with a conductor in a water droplet existing region, the control unit 30 does not execute the processing of the step S106.

In step S107, the control unit 30 executes a single touch process of step S108 or a multi-touch process of step S109 depending on the number of conductor contact regions after excluding water droplet existing regions in the step S106. Details of these processes are shown in FIG. 12 and FIG. 13.

Figure 12:
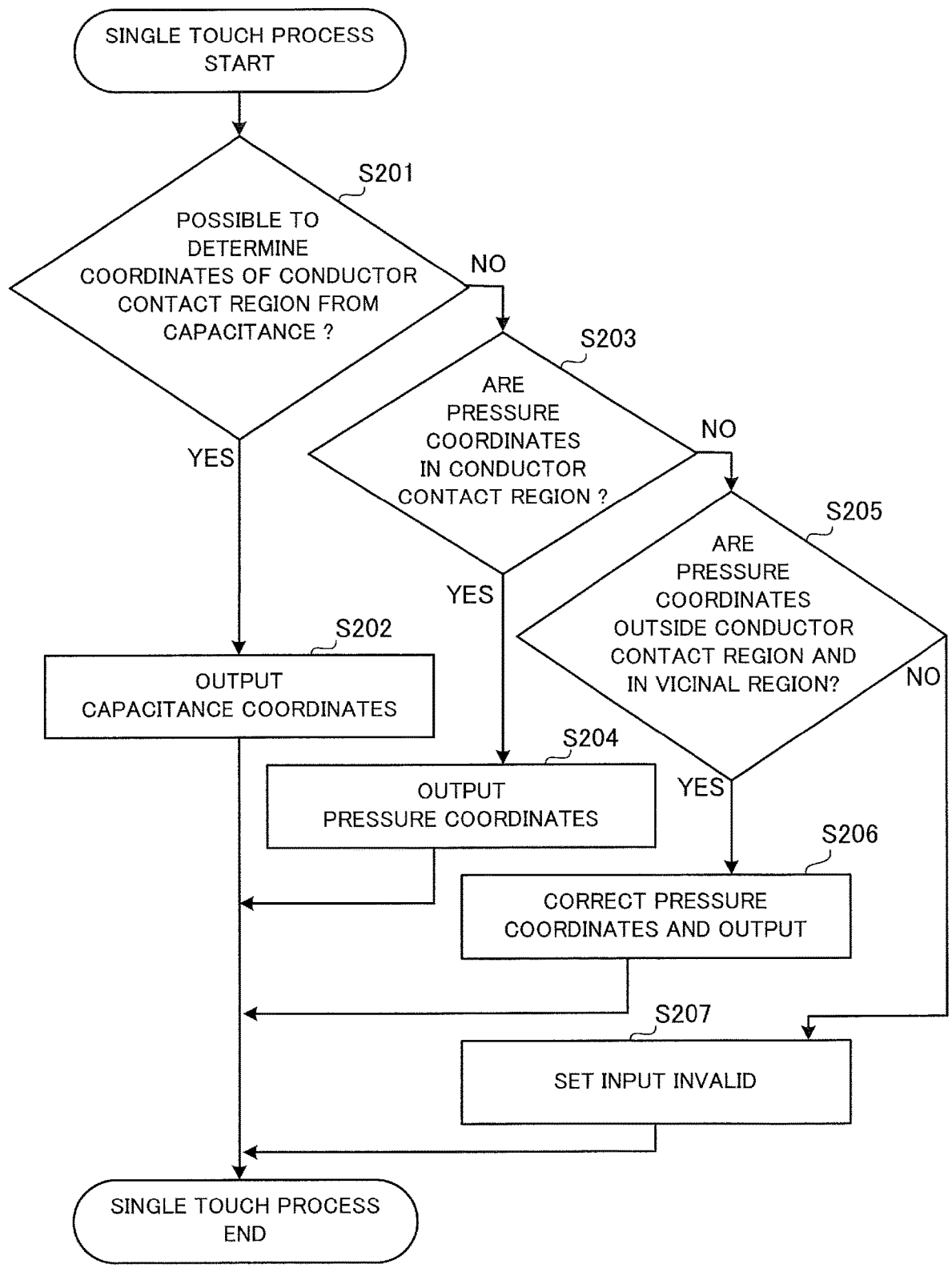
FIG. 12 is a flowchart showing an example of a single touch process in FIG. 11.
Figure 13:
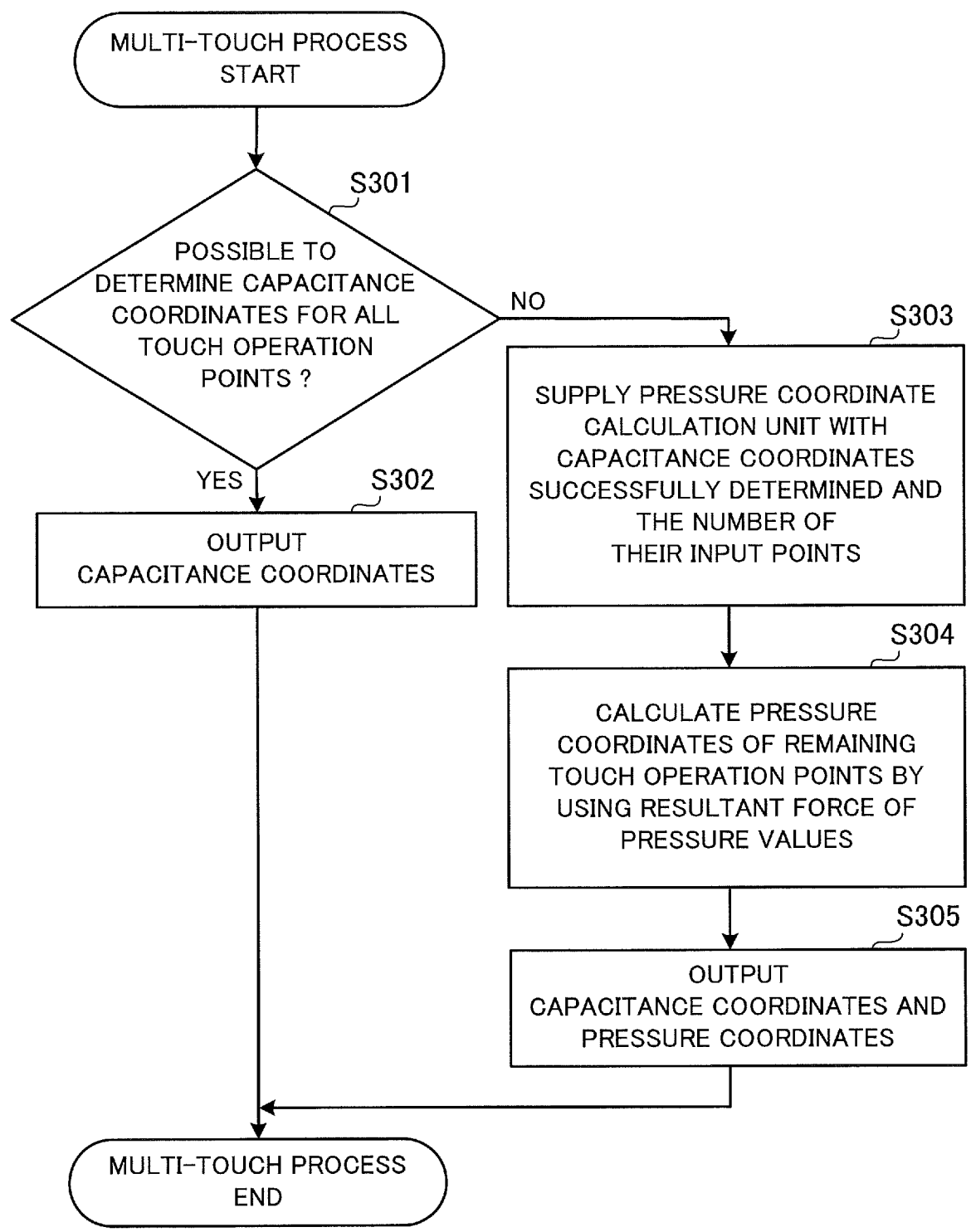
FIG. 13 is a flowchart showing an example of a multi-touch process in FIG. 11.

FIG. 12 is a flowchart showing the single touch process in the touch panel device according to the first embodiment. First, in step S201, the control unit 30 judges whether it is possible to determine the coordinates of the conductor contact region from the capacitance or not. When it is possible, the control unit 30 outputs the capacitance coordinates in step S202. This processing is the processing in the aforementioned "operation example 4.1".

When it is difficult to determine the capacitance coordinates in the step S201, the control unit 30 in step S203 judges whether or not the pressure coordinates exist in the conductor contact region. When the pressure coordinates exist, the control unit 30 outputs the pressure coordinates in step S204. This processing is the processing in the aforementioned "operation example 4.2".

When the pressure coordinates are situated outside the conductor contact region, the control unit 30 in step S205 considers the error in calculating the pressure coordinates and judges whether the pressure coordinates exist in a vicinal region within a certain distance from the conductor contact region. When the pressure coordinates exist in the vicinal region, the control unit 30 outputs the pressure coordinates corrected by the correction method explained with reference to FIG. 9, for example, in step S206. This processing is the processing in the aforementioned "operation example 4.3".

When the distance between the pressure coordinates and the conductor contact region is a certain distance or more, it may be considered that a touch operation with an insulator or the like has been performed, and thus the control unit 30 sets the input invalid in step S207. This processing is the processing in the aforementioned "operation example 4.4".

FIG. 13 is a flowchart showing the multi-touch process in the touch panel device according to the first embodiment. In step S301, the control unit 30 judges whether it is possible to specify the capacitance coordinates regarding all touch operation points or not. when it is possible, the control unit 30 outputs the capacitance coordinates in step S302.

When it is difficult to specify the coordinates by the electrostatic capacitance method, the control unit 30 in step S303 notifies the pressure coordinate calculation unit 54 of multiple sets of capacitance coordinates successfully specified and the number of their input points. This processing is the processing in the aforementioned "operation example 5.1".

In step S304, the control unit 30 determines the pressure coordinates in consideration of the fact that a plurality of touch operation points influence each pressure sensor 20a, 20b, 20c, 20d in the form of resultant force. In step S305, the control unit 30 outputs the capacitance coordinates and the pressure coordinates. This processing is the processing in the aforementioned "operation example 5.2".

(1-3) Effect

As described above, with the touch panel device 1 according to the first embodiment, the touch operation can be judged correctly even when a water droplet exists on the operation surface 11 of the touch panel 10. Accordingly, erroneous inputs can be reduced.

(2) Second Embodiment

In the first embodiment, an input is set invalid except in a case where both of capacitance higher than the threshold capacitance ThC and pressing force Fp greater than the threshold pressing force ThF are detected. However, there is a case where a touch operation is performed on the operation surface of the touch panel with a device made with an insulator. In other words, there is a case where the capacitance is not changed and only the pressing force Fp is detected. In such a case, the touch panel device may output the pressure coordinates calculated by using the aforementioned equations (1) and (2). This corresponds to the "operation example 2" in FIG. 6(a).

Figure 14:
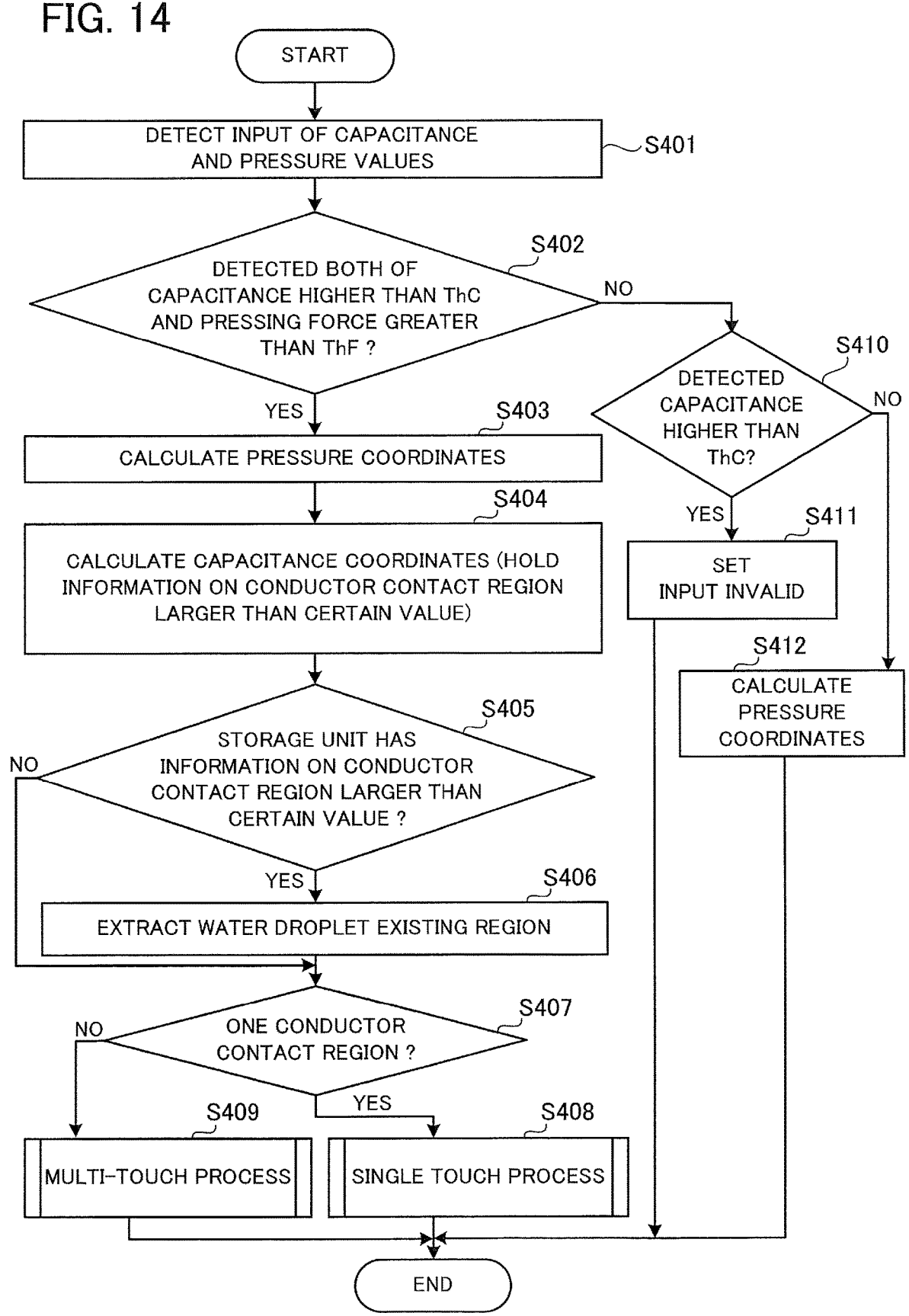
FIG. 14 is a flowchart showing an operation example of a touch panel device according to a second embodiment of the present invention.

FIG. 14 is a flowchart showing an operation of a touch panel device according to a second embodiment. Steps S401 to S409 in FIG. 14 are the same as the steps S101 to S109 in FIG. 11. The touch panel device according to the second embodiment differs from the touch panel device 1 according to the first embodiment in executing the processing of steps S410 to S412 in FIG. 14. Therefore, FIGS. 1 to 10, 12 and 13 will also be referred to in the second embodiment.

In the step S410, the control unit 30 judges whether or not capacitance higher than the threshold capacitance ThC is detected. When capacitance higher than the threshold capacitance ThC is detected, the control unit 30 recognizes that the current state is a state in which a conductor such as a water droplet is in contact with the operation surface 11 of the touch panel 10 and sets the input invalid in step S411. When capacitance higher than the threshold capacitance ThC is not detected, that is, when pressing force Fp greater than the threshold pressing force ThF is detected, the control unit 30 calculates the pressure coordinates in step S412.

As described above, with the touch panel device according to the second embodiment, the touch operation can be judged correctly even when a water droplet exists on the operation surface 11 of the touch panel 10. Accordingly, erroneous inputs can be reduced.

Further, it is possible to output operation information based on an input operation performed by using a device made with an insulator.

(3) Third Embodiment

In the first and second embodiments, the description is given of a method of determining absolute coordinates as the pressure coordinates of the pressing position from the pressure values Fa to Fd. In a third embodiment, a description will be given of a method of converting the pressure coordinates of the pressing position of a touch operation into relative moving distances of the pressure coordinates by using change information on the pressure values Fa to Fd on a time axis. Specifically, in the third embodiment, the control unit 30 determines the relative moving distances ($\Delta x$, $\Delta y$) based on the difference between coordinates at a first time point as the pressure coordinates (second coordinates) detected earlier in time and coordinates at a second time point as the pressure coordinates (second coordinates) detected later in time, and regards the relative moving distances ($\Delta x$, $\Delta y$) as the second coordinates.

The touch panel device according to the third embodiment is the same as the touch panel device according to the first or second embodiment except for the use of the relative moving distances of the pressure coordinates. Therefore, FIGS. 1 to 14 will also be referred to in the third embodiment.

Figure 15A:
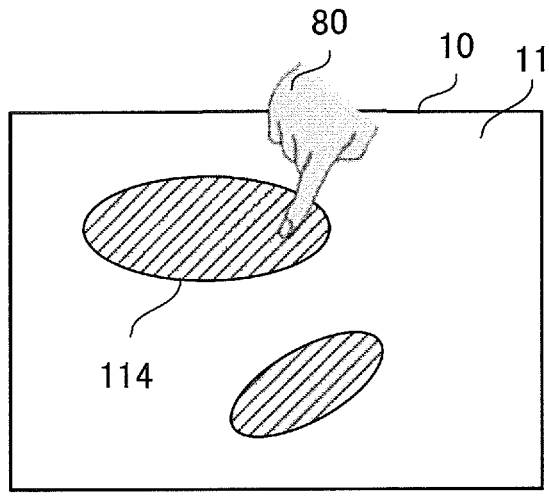
FIGS. 15(a) to 15(c) are diagrams showing an example of a method of calculating the pressure coordinates indicating the detection position of the pressing force when a single touch operation is performed on an operation surface of a touch panel on a touch panel device according to a third embodiment of the present invention.
Figure 15B:
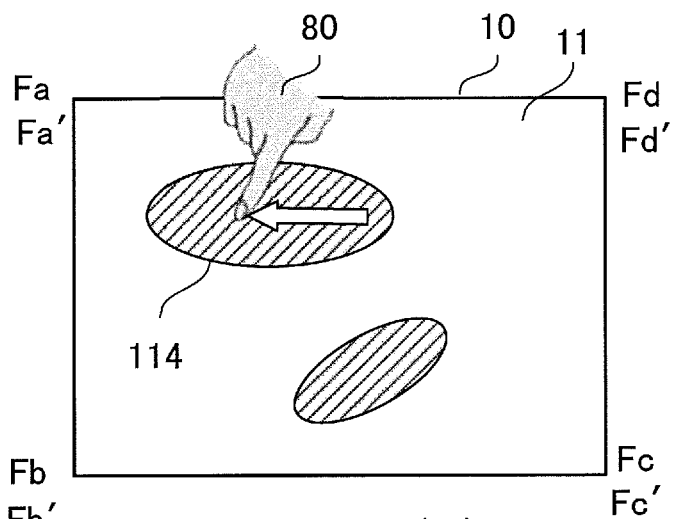
Figure 15C:
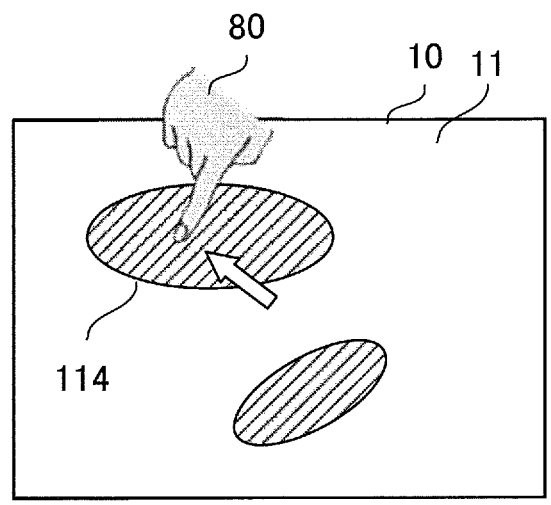

FIGS. 15(a) to 15(c) are diagrams showing the operation of the touch panel device according to the third embodiment. FIGS. 15(a) to 15(c) show an approximate calculation method of the relative moving distances by using the change in the pressure coordinates. The calculation method is as follows: Pressure difference values $\Delta Fx$ and $\Delta Fy$ between a detected pressure value and a pressure value detected at a time point earlier in time (e.g., detected the last time) are calculated in the x-axis direction and the y-axis direction, and the relative moving distances $\Delta x$ and $\Delta y$ are obtained by multiplying the pressure difference values in the x-axis direction and the y-axis direction by a coefficient $\alpha$ for the conversion into the relative moving distances of the pressure coordinates. Specifically, when Fa, Fb, Fc and Fd respectively represent the pressure values acquired from the pressure sensors 20a, 20b, 20c and 20d, Fa', Fb', Fc' and Fd' respectively represent the pressure values acquired the last time from the pressure sensors 20a, 20b, 20c and 20d, and $\alpha$ represents the coefficient used for the conversion from the pressure values into the moving distances, the relative moving distances $\Delta x$ and $\Delta y$ in the x-axis direction and the y-axis direction are obtained by using the following expressions (7) and (8)

$$\Delta x = ((Fc+Fd-Fa-Fb)-(Fc'+Fd'-Fa'-Fb'))\alpha \qquad (7)$$

$$\Delta y = ((Fa+Fd-Fb-Fc)-(Fa'+Fd'-Fb'-Fc'))\alpha \qquad (8)$$

Since the pressure value and the distance from the pressure coordinates to the detection position of the pressure are inversely proportional to each other, the conversion coefficient $\alpha$ is a parameter that should be changed depending on the position of the pressure coordinates. Namely, it is desirable to change the value of the conversion coefficient $\alpha$ depending on the range of the water droplet existing region and the information on the pressure values.

Figure 16:
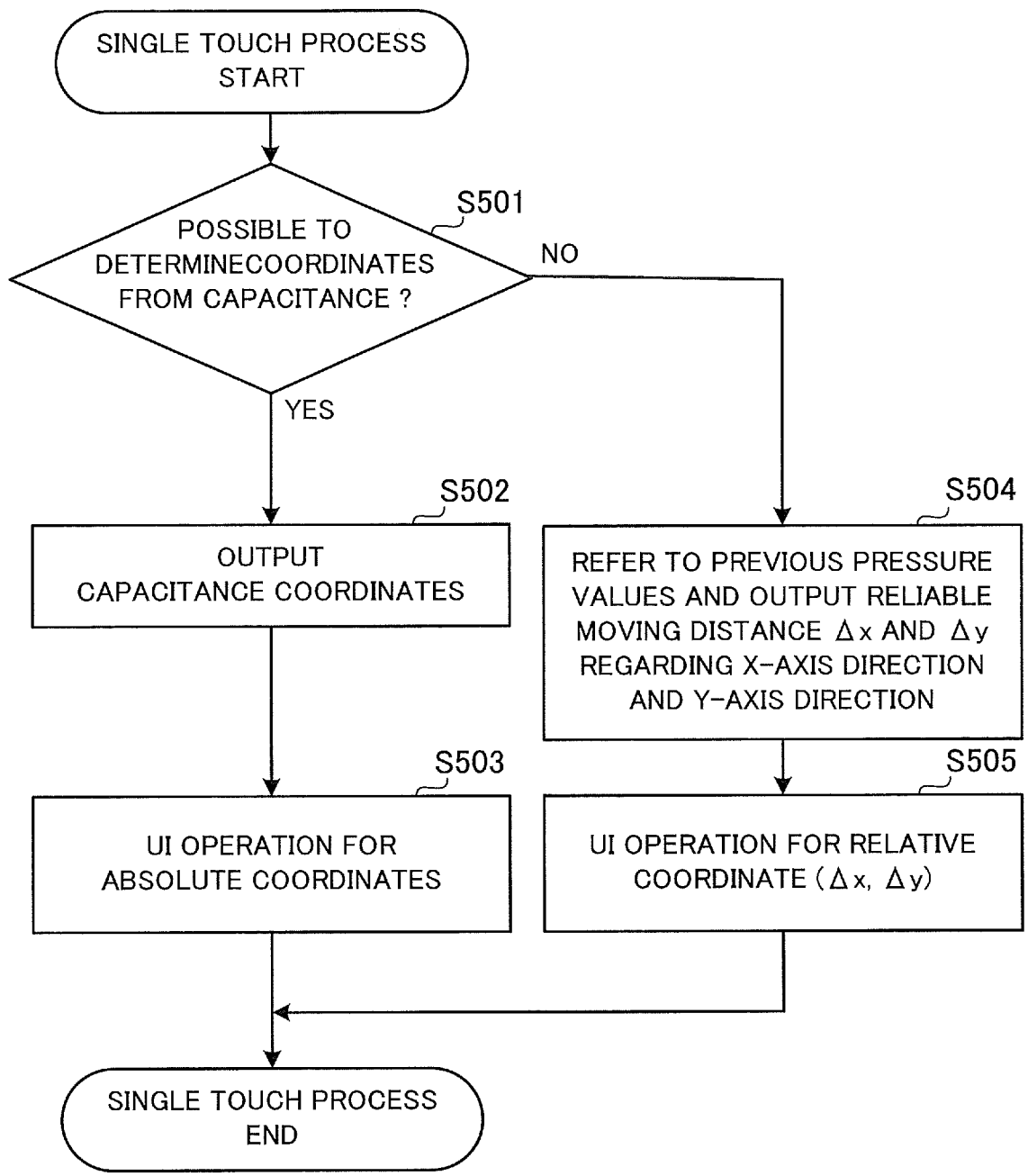
FIG. 16 is a flowchart showing an example of a single touch process in the touch panel device according to the third embodiment.

FIG. 16 is a flowchart showing the operation of the touch panel device according to the third embodiment. FIG. 16 shows a process performed in a system that calculates the relative moving distances $\Delta x$ and $\Delta y$ by using change amounts of the pressure when the coordinates of a single touch operation are detected.

In step S501, the control unit 30 judges whether it is possible to determine the capacitance coordinates from the capacitance or not. When it is possible, the control unit 30 in step S502 outputs the coordinates calculated by the electrostatic capacitance method. In the next step S503, a user interface (UI) operation in regard to the absolute coordinates is performed.

When it is difficult to determine the coordinates by the electrostatic capacitance method, the control unit 30 in step S504 outputs the relative moving distances $\Delta x$ and $\Delta y$ regarding the x-axis direction and the y-axis direction by using the calculation method indicated by the expressions (7) and (8).

In the next step S505, a UI operation for the relative coordinates (moving distances) is performed.

As described above, with the touch panel device according to the third embodiment, the touch operation can be judged correctly even when a water droplet exists on the operation surface 11 of the touch panel 10. Accordingly, erroneous inputs can be reduced.

Further, it is possible to output operation information based on an input operation performed by using a device made with an insulator.

(4) Modification

In the first to third embodiments, the description is given of examples in which an operation signal based on the first coordinates as the capacitance coordinates or based on the second coordinates as the pressure coordinates is outputted depending on a certain condition. In the electrostatic capacitance method, however, when a touch operation is performed in a water droplet existing region, it is also possible to regard the central coordinates of the water droplet existing region or a point where a change amount of the capacitance is the greatest as the position of the touch operation. In this case, there is a difference between the capacitance coordinates and the pressure coordinates. With the decrease in this difference, the capacitance coordinates and the pressure coordinates can be regarded as coordinates of higher accuracy and higher reliability.

Therefore, it is possible to acquire data regarding the difference between the capacitance coordinates and the pressure coordinates, define degrees of reliability of the capacitance coordinates and the pressure coordinates, feed back information on the defined degrees of reliability to an application (application software) installed in the touch panel device, and thereby increase the variety of the interaction of the application. For example, it is possible to control the touch panel device so as to judge the coordinates of the operation position without considering the degrees of reliability in regard to applications not requiring high input accuracy, and to judge the coordinates of the operation position by taking the information on the degrees of reliability into consideration in regard to applications requiring high input accuracy.

It is also possible to combine features of this modification with any one of the first to third embodiments.

DESCRIPTION OF REFERENCE CHARACTERS

1: touch panel device, 10: touch panel, 11: operation surface, 20: pressure sensor unit, 20a, 20b, 20c, 20d: pressure sensor, 30: control unit, 31: processor, 32: memory, 51: capacitance detection unit, 52: capacitance coordinate calculation unit, 53: pressure detection unit, 54: pressure coordinate calculation unit, 55: water droplet existing judgment unit, 56: touch validity judgment unit, 101-104, 111-114: conductor contact region, 105: vicinal region, 201-204: pressing position, ThC: threshold capacitance, ThF: threshold pressing force, Fp: pressing force, Fa–Fd: pressure value.

What is claimed is:

1. A touch panel device comprising:
a touch panel having an operation surface on which a touch operation is performed and capacitance of a conductor contact region of the operation surface changes;
at least one pressure sensor to output a pressure detection signal according to pressing force applied to the operation surface and a pressing position; and
a controller to calculate first coordinates on the operation surface based on the capacitance and calculates second coordinates on the operation surface based on a pressure value indicated by the pressure detection signal, wherein the controller outputs an operation signal based on the first coordinates when a first region as a region where the capacitance is higher than predetermined threshold capacitance is detected, size of the first region is less than or equal to a predetermined certain value, and the pressing force is greater than predetermined threshold pressing force.

2. The touch panel device according to claim 1, wherein the controller outputs an operation signal based on the second coordinates when a second region as a region where the capacitance is higher than the threshold capacitance is detected, size of the second region is greater than the certain value, and the pressing force is greater than the threshold pressing force.

3. The touch panel device according to claim 1, wherein when a third region as a region where the capacitance is higher than predetermined threshold capacitance is detected, size of the third region is greater than the certain value, the pressing force is greater than the threshold pressing force, and the second coordinates exist in a vicinal region outside the third region and surrounding the third region within a predetermined certain distance from the third region, the controller outputs an operation signal based on corrected second coordinates obtained by moving the second coordinates towards the third region.

4. The touch panel device according to claim 3, wherein the controller outputs an operation signal based on the second coordinares when a fourth region as a region where the capacitance is higher than predetermined threshold capacitance is detected, size of the fourth region is greater than the certain value, the pressing force is greater than the threshold pressing force, and the second coordinates exist outside the third region and the vicinal region.

5. The touch panel device according to claim 1, wherein the controller outputs an operation signal based on the first coordinates when fifth and sixth regions as regions where the capacitance is higher than predetermined threshold capacitance are detected, size of each of the fifth and sixth regions is less than or equal to the certain value, and the pressing force is greater than the threshold pressing force.

6. The touch panel device according to claim 1, wherein when seventh and eighth regions as regions where the capacitance is higher than predetermined threshold capacitance are detected, size of the seventh region is less than or equal to the certain value, size of the eighth region is greater than the certain value, and the pressing force is greater than the threshold pressing force, the controller outputs an operation signal based on the first coordinates in regard to the seventh region and outputs an operation signal based on the second coordinates in regard to the eighth region.

7. The touch panel device according to claim 1, wherein the controller outputs no operation signal when no region where the capacitance is higher than predetermined threshold capacitance is detected and no pressing force greater than the threshold pressing force is detected.

8. The touch panel device according to claim 1, wherein the controller outputs no operation signal when no region where the capacitance is higher than predetermined threshold capacitance is detected and the pressing force greater than the threshold pressing force is detected.

9. The touch panel device according to claim 1, wherein the controller outputs an operation signal based on the second coordinates when no region where the capacitance is higher than predetermined threshold capacitance is detected and the pressing force greater than the threshold pressing force is detected.

10. The touch panel device according to claim 1, wherein the controller outputs no operation signal when a region where the capacitance is higher than predetermined threshold capacitance is detected and no pressing force greater than the threshold pressing force is detected.

11. The touch panel device according to claim 1, wherein the controller determines relative moving distances based on difference between coordinates at a first time point as the second coordinates detected earlier in time and coordinates at a second time point as the second coordinates detected later in time, and regards the relative moving distances as the second coordinates.

12. The touch panel device according to claim 1, wherein the at least one pressure sensor includes a plurality of pressure sensors supporting the touch panel.

* * * * *